US012574858B2

(12) United States Patent
Lotter

(10) Patent No.: US 12,574,858 B2
(45) Date of Patent: *Mar. 10, 2026

(54) SYSTEM FOR CONTROLLING THE EMISSIONS OF A REPEATER

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,083

(22) Filed: Mar. 4, 2024

(65) Prior Publication Data

US 2024/0205842 A1 Jun. 20, 2024

Related U.S. Application Data

(63) Continuation of application No. 17/983,257, filed on Nov. 8, 2022, now Pat. No. 11,924,776.

(51) Int. Cl.
*H04W 52/24* (2009.01)
*H04W 16/26* (2009.01)

(52) U.S. Cl.
CPC ......... *H04W 52/243* (2013.01); *H04W 16/26* (2013.01)

(58) Field of Classification Search
CPC .... H04W 52/243; H04W 16/26; H04B 10/29; H04B 10/293; H04B 10/298; H04M 1/72412; H04M 1/72463
See application file for complete search history.

(56) References Cited

U.S. PATENT DOCUMENTS

| | | | | |
|---|---|---|---|---|
| 2003/0123401 A1* | 7/2003 | Dean | ................. | H04B 7/15535 |
| | | | | 370/318 |
| 2008/0274718 A1* | 11/2008 | Roper | .................... | H04M 1/67 |
| | | | | 455/411 |
| 2012/0315894 A1* | 12/2012 | Dussmann | ......... | H04B 7/15535 |
| | | | | 455/424 |
| 2018/0062738 A1* | 3/2018 | Webb | .................. | H04B 10/071 |

OTHER PUBLICATIONS

International Searching Authority of the PCT; "Notification of of Transmittal of the International Search Report and the Written Opinion of the International Searching Authority, of the Declaration" dated Jan. 5, 2024; PCT Application No. PCT/US23/37027 filed Nov. 8, 2023; pp. 1-9 (2024).

* cited by examiner

*Primary Examiner* — John J Lee
(74) *Attorney, Agent, or Firm* — FisherBroyles LLP; James P. Cleary

(57) ABSTRACT
A system and method for minimizing interference between communication systems in an area. A system includes a repeater that is positioned within the area. The repeater includes a donor antenna communicating between the repeater and a wireless base station, a server antenna communicating between the repeater and a user device, a downlink transmission path to boost and repeat signals received by the donor antenna to the server antenna, and an uplink transmission path to boost and repeat signals received by the server antenna to the donor antenna. The system includes an emissions control system having control inputs that are processed to control a total output power level in a passband of the signal transmissions on the uplink transmission path by the repeater, and/or emissions outside the passband of the signal transmissions on the uplink transmission path by the repeater, based on the one or more processed control inputs.

9 Claims, 2 Drawing Sheets

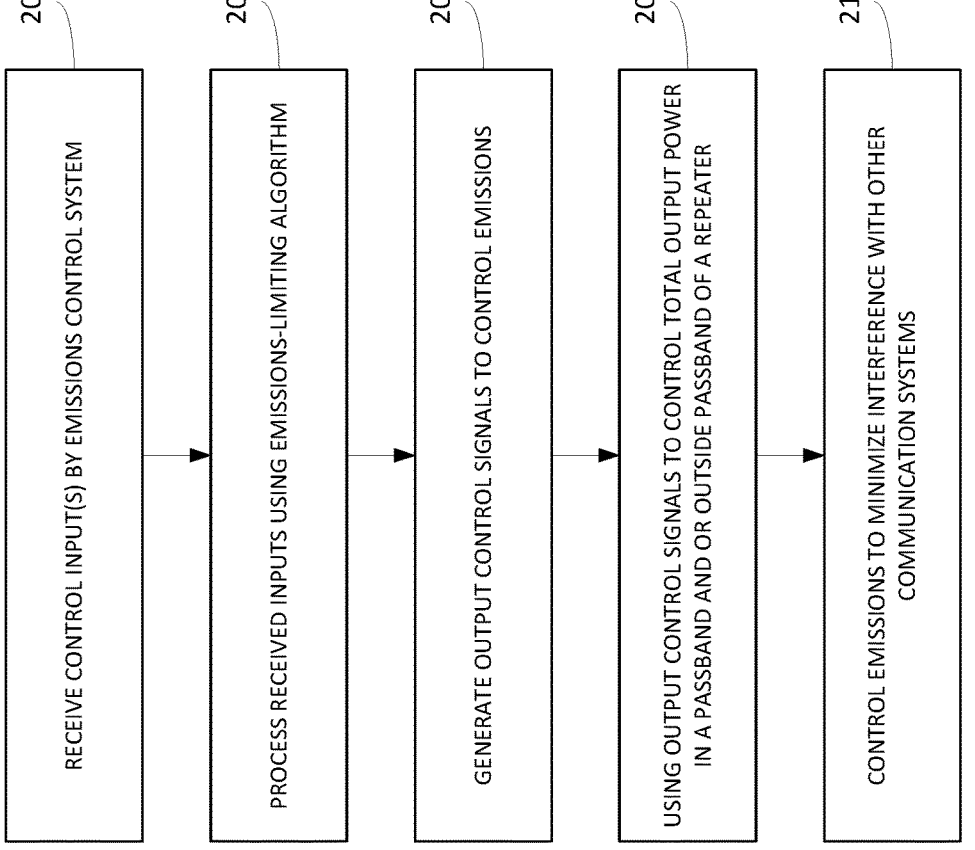

202 — RECEIVE CONTROL INPUT(S) BY EMISSIONS CONTROL SYSTEM

204 — PROCESS RECEIVED INPUTS USING EMISSIONS-LIMITING ALGORITHM

206 — GENERATE OUTPUT CONTROL SIGNALS TO CONTROL EMISSIONS

208 — USING OUTPUT CONTROL SIGNALS TO CONTROL TOTAL OUTPUT POWER IN A PASSBAND AND OR OUTSIDE PASSBAND OF A REPEATER

210 — CONTROL EMISSIONS TO MINIMIZE INTERFERENCE WITH OTHER COMMUNICATION SYSTEMS

SYSTEM FOR CONTROLLING THE EMISSIONS OF A REPEATER

BACKGROUND

Wireless repeaters can be used in various settings to boost wireless communication signals, such as cellular signals, in order to resolve problems with poor coverage in those settings. Many wireless repeaters have a downlink transmission path for receiving signals wirelessly from a base station via a donor antenna for being relayed to one or more user devices via a server antenna, and an uplink transmission path for receiving signals from the wireless device via the server antenna to be relayed to the base station via the donor antenna.

As with any other wireless transmitter, there is a possibility that some transmissions by the repeater could interfere with other wireless systems that operate in the same setting or area. Some radio frequency (RF) electromagnetic field (EMF) emissions that occur during those transmissions, and which radiate from the wireless transmitter antennas for example, might interfere with RF signals from other wireless systems.

Typically, emissions interference is controlled through standards-setting, such as the 802.11 IEEE standards, which govern how wireless devices should perform and be operated, and which specifically sets standards for allowed emissions. However, under some circumstances, generic allowed emissions standards are not sufficient to ensure that emissions interference among wireless systems does not occur.

Accordingly, there is a need for wireless networks to have additional protection against emissions interference among wireless communication systems.

SUMMARY

This document presents a system and method to provide additional protection to wireless networks from emissions interference by repeaters, and in particular wireless repeaters.

In some aspects, a system for minimizing interference between communication systems in an area is presented. A system includes a repeater that is positioned within the area. The repeater includes a donor antenna communicating between the repeater and a wireless base station, a server antenna communicating between the repeater and a user device, a downlink transmission path to boost and repeat signals received by the donor antenna to the server antenna, and an uplink transmission path to boost and repeat signals received by the server antenna to the donor antenna. The system includes an emissions control system having control inputs that are processed to control a total output power level in a passband of the signal transmissions on the uplink transmission path by the repeater, and/or emissions outside the passband of the signal transmissions on the uplink transmission path by the repeater, based on the one or more processed control inputs.

In other aspects, a method of controlling emissions of a repeater to avoid interference with other communication systems in an area associated with the repeater is presented. The method can include receiving, by an emissions control system communicatively connected with the repeater, one or more control inputs that can be processed to generate outputs configured to control the emissions of the repeater during signal transmissions by the repeater to avoid interference with the other communication systems in the area associated with the repeater. The method can further include controlling, by the emissions control system, a total output power level in a passband of the signal transmissions by the repeater, and/or emissions outside the passband of the signal transmissions by the repeater, based on the one or more processed control inputs. The method can further include minimizing the interference with the other communication systems using an in-band emissions limiting algorithm and/ or an out-of-band emissions limiting algorithm executed by the emissions control system.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 2 is a flowchart of a method of controlling emissions of a repeater to avoid interference with other communication systems in an area associated with the repeater.

Like reference symbols in the various drawings indicate like elements.

DETAILED DESCRIPTION

Figure 1:
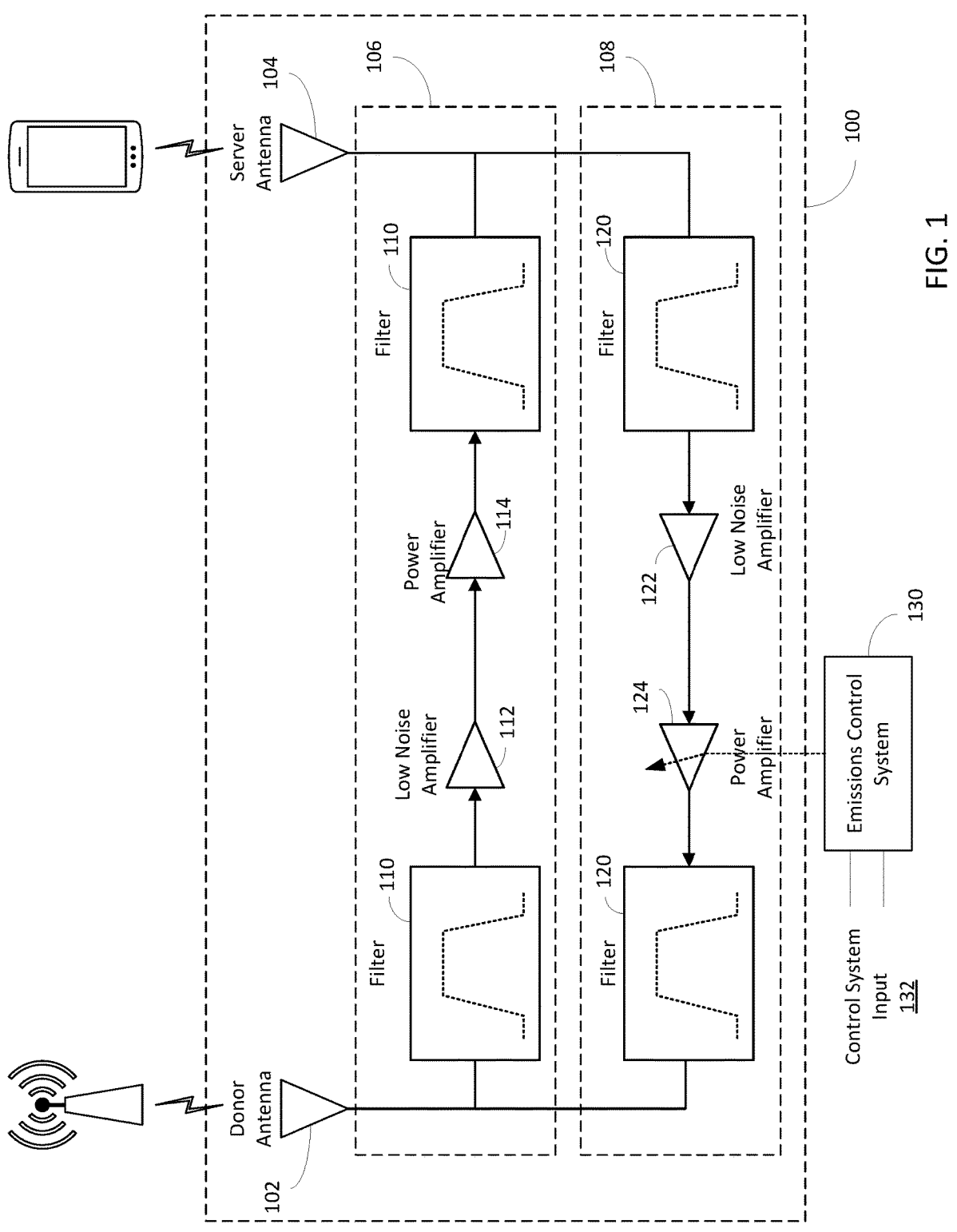
FIG. 1 shows a system for controlling emissions of a repeater to avoid interference with other communication systems in an area associated with the repeater.

This document describes a wireless repeater ("repeater"), where the RF-EMF emissions ("emissions") of the repeater is controlled by an emissions control system. The emissions control system controls a total output power level in a passband of the repeater, as well as the emissions outside of the passband of the repeater. The emissions control system includes one or more inputs.

Inputs to the emissions control system can include, but are not limited to: the signal level measured at the input to the repeater within the passband of the repeater; the signal level measured at the input to the repeater outside the passband of the repeater; a position in space of the repeater; and/or a location information derived from the control information transmitted by a cellular tower (such as, for example, the Cell-ID).

The inputs can be provided by measurement circuits within a measurement device that measures in-band power, out-of-band power etc. In some implementations, the measurement device can be integrated with one or more wireless base stations, and information from each base station could potentially processed outside the emissions control system. For instance, a base station can calculate a distance to maximum emission level outside the emission control system, for example. Alternatively, the measurement device can be part of, or integrated with, the emissions control system.

This document further describes algorithms that limit the in-band emissions of the repeater by combining two or more of the inputs to the emissions control system, as well as limit the out-of-band emissions of the repeater by combining two or more of the inputs as described herein. In some implementations, for example, a system and method are described to limit or avoid emissions interference in the C-band (4.0 to 8.0 GHz and 3.7 to 4.2 GHz as designated by the U.S. Federal Communications Commission), which is used for satellite communications, weather radar systems, WiFi communications, and some communications in and around airports, particularly if the C-band is out-of-band of the communications of the passband of the repeater.

FIG. 1 illustrates a system for controlling emissions of a repeater 100. The repeater 100 includes a donor antenna 102 wirelessly connected with a base station, cellular tower, or the like, and a server antenna 104 wirelessly connected with a user device such as a cellular phone, laptop computer, tablet computer. The repeater 100 includes a downlink transmission path 106 for communications from the donor antenna 102 to the server antenna 104. The downlink transmission path 106 can include one or more filters 110 (i.e., passband filters), a low noise amplifier 112, and a power amplifier 114 that is configured to boost a power of downlink passband signals for being repeated by the repeater 100 to the user device via the server antenna 104.

The repeater 100 further includes an uplink transmission path 108 for communications from the server antenna 104 to the donor antenna 102. As with the downlink transmission path 106, the uplink transmission path 108 can include one or more filters 120 (i.e., passband filters), a low noise amplifier 122, and a power amplifier 124 that is configured to boost a power of uplink passband signals for being repeated by the repeater 100 to the base station via the donor antenna 102.

In preferred implementations, the system for controlling emissions of the repeater 100 further includes an emissions control system 130 that is configured to control emissions on the uplink transmission path to minimize or avoid a possibility that the transmission of the repeater 100 could interfere with other wireless communication systems that operate in the same geographical area and/or within similar frequency bands or transmission channels. The emissions control system 130 is configured to respond to one or more control inputs 132 and includes circuitry and other mechanisms and software to control emissions, such as controlling the in-band output power level, controlling the bias level of the power amplifier 124, etc.

The emissions control system 130, while illustrated in FIG. 1 as being external to the repeater 100, can also be integrated within the repeater 100 and form part of the repeater's circuitry. In some implementations, the emissions control system 130 can be external to the repeater 100 and communicate control signals via a wireless (i.e., WiFi, Bluetooth, etc.) or wired channel.

The control inputs 132 can include measurement circuits within the emissions control system 130, or remote from the emissions control system 130. Inputs 132 to the emissions control system 130 can include, without limitation: a signal level measured at an input to the repeater within the passband of the repeater; a signal level measured at the input to the repeater outside the passband of the repeater; a physical position in space of the repeater 100; and/or location information derived from control information transmitted by a cellular tower (such as for example the Cell-ID) and received via the donor antenna 102.

Input could include measurement circuits that measures in-band power, out-of-band power etc. The information from the cellular tower can be processed outside the system, i.e., a distance to a maximum emission level outside the emissions control system 130, for example, or it can be part of the system.

In some implementations, circuitry for generating and/or receiving and processing the inputs 132 can include an input stage that can be digital or analog inputs, a compute stage having software running on a general-purpose processor, application specific integrated circuit (ASIC), or field programmable gate array (FPGA) (or combination thereof), and an output stage providing digital or analog signals that can be used to control the emissions of the repeater 100.

As discussed above, inputs to an emissions control system can include, without limitation: a signal level measured at an input to the repeater within the passband of the repeater; a signal level measured at the input to the repeater outside the passband of the repeater; a physical position in space of the repeater; and/or location information derived from control information transmitted by a cellular tower or other base station equipment and received via the donor antenna of the repeater.

FIG. 2 is a flowchart of a method 200 of controlling emissions of a repeater to avoid interference with other communication systems in an area associated with the repeater. At 202, control inputs are received by an emissions control system associated with the repeater. The emissions control system can be a combination of hardware (circuitry, processors, etc.), software (executing power-limiting algorithms, etc.), and firmware. At 204, the emissions control system processes the inputs, to generate output control signals at 206.

The emissions control system can combine two or more inputs and process the combined inputs using one or more emissions-limiting algorithms provided on a tangible computer-readable medium and executed on a processor of the computer. At 208, the emissions control system, controls a total output power level in a passband of the signal transmissions by the repeater, and/or controls emissions outside the passband of the signal transmissions by the repeater, based on the one or more processed control inputs, to thereby minimize or avoid interference with other wireless communication systems within an area occupied by the repeater, or a zone around the repeater.

Although a few embodiments have been described in detail above, other modifications are possible. Other embodiments may be within the scope of the following claims.

The invention claimed is:

1. A system for controlling emissions of a repeater to avoid interference with other communication systems in an area associated with the repeater, the system comprising:
 a donor antenna configured for communicating between the repeater and a wireless base station;
 a server antenna configured for communicating between the repeater and a user device;
 a downlink transmission path configured to boost and repeat signals received by the donor antenna to the server antenna;
 an uplink transmission path configured to boost and repeat, signals received by the server antenna to the donor antenna; and
 an emissions control system having one or more control inputs and being configured to generate an output to limit in-band or out-of-band emissions of the repeater, and being further configured to combine the two or more control inputs to generate the output to limit in-band or out-of-band emissions of the repeater.

2. The system in accordance with claim 1, wherein the emissions control system is configured to control emissions of signal transmissions from the uplink transmission path based on the one or more control inputs.

3. The system in accordance with claim 1, wherein the one or more control inputs includes a signal level measured at an input to the repeater within the passband of the repeater.

4. The system in accordance with claim 1, wherein the one or more control inputs includes a physical position spaced from the repeater.

5. The system in accordance with claim 1, wherein the one or more control inputs includes location information derived from control information transmitted by the wireless base station.

6. The system in accordance with claim 1, wherein the one or more control inputs includes location information derived from control information transmitted by a cellular tower and received via the donor antenna.

7. The system in accordance with claim 6, wherein the location information includes a location of each of the other communication systems.

8. The system in accordance with claim 6, wherein the location information includes a location of the repeater.

9. The system in accordance with claim 6, wherein the location information includes a location of the repeater and a location of each of the other communication systems.

\* \* \* \* \*